United States Patent [19]
Sheinbaum

[11] 3,988,895
[45] Nov. 2, 1976

[54] POWER GENERATION FROM HOT BRINES

[76] Inventor: Itzhak Sheinbaum, Country Club Drive, Burbank, Calif. 91501

[22] Filed: Jan. 11, 1974

[21] Appl. No.: 432,482

[52] U.S. Cl. .............................. 60/641; 122/31 R
[51] Int. Cl.² ..................... F03G 7/00; F01K 25/08
[58] Field of Search ........................ 122/31; 60/641

[56] References Cited
UNITED STATES PATENTS

| | | | |
|---|---|---|---|
| 2,222,575 | 11/1940 | Schutte | 122/31 R |
| 2,561,471 | 7/1951 | Hatfield | 122/31 R |
| 3,845,627 | 11/1974 | Hutchinson | 60/651 |

FOREIGN PATENTS OR APPLICATIONS

| | | | |
|---|---|---|---|
| 114,120 | 9/1929 | Austria | 122/31 R |

*Primary Examiner*—Allen M. Ostrager
*Attorney, Agent, or Firm*—Jessup & Beecher

[57] ABSTRACT

Hot fluid which may contain salts and other dissolved minerals is passed through a direct contact heat exchanger in heat exchange relationship with a working fluid that has a specific gravity sufficiently below the specific gravity of the fluid so that it may pass from the bottom to the top of the heat exchanger chamber in contact with the fluid. The pressure of the chamber is selected to provide a certain mixture of working fluid and hot fluid at the output of the power extracting device of the system. The working fluid is selected so that the salts and other minerals in the fluid are relatively insoluble therein. The working fluid is vaporized in the exchanger and the vaporized working fluid and any steam mixed therewith are passed through a power extracting gas expansion device. The working fluid is separately condensed and recirculated.

11 Claims, 5 Drawing Figures

3,988,895

POWER GENERATION FROM HOT BRINES

BACKGROUND OF THE INVENTION

1. Field of the Invention

This invention relates to extraction of useful energy from hot fluids which may contain salts and other dissolved minerals.

It is known that the interior of the earth is a molten mass of rocks and is very hot. This geothermal heat energy may advantageously and efficiently be employed as a primary source of energy for the generation of power through fluid as a carrier. The fluid may appear as steam released from volcanic areas or hot water which is present in volcanic deposits and in deep alluvial deposits that are porous enough to permit percolation of water to the deep hot zones. This fluid may have a temperature as high as 700° F. at a depth of 5,000 feet.

2. Description of the Prior Art

In areas where steam alone is produced, the steam may be used directly in turbines to drive generators to generate electricity. Where there is a mixture of steam and hot water, the steam may be separated in a flash chamber and then used in a steam turbine or to heat a working fluid. However, the steam and the hot water generally contain corrosive materials that can cause destruction of the critical and expensive parts of the rotating machinery employed to convert the energy of the steam and hot water into mechanical and/or electrical energy.

As an efficient way of utilizing hot fluid which may contain salts and other dissolved minerals, especially hot fluids from a geothermal well, a working fluid is superheated by passing the working fluid in heat exchange relationship with the hot fluid. The working fluid has a boiling point that is below the input temperature of the hot fluid. This method and apparatus for utilizing the hot fluid as a primary source of energy represents an efficient way for generating power from hot fluids.

However, there are some hot fluids that contain such a degree of salts and other dissolved minerals that the above method may not be efficiently and economically useful over a long period of time. For example, it is known that the water from some of the geothermal wells in the Imperial Valley in California have more than 400,000 parts per million of dissolved solids which include salts and other minerals. The passage of this brine through a heat exchanger can result in the deposit of silica or other types of scale therein with a substantial decrease in the heat transfer efficiency within the heat exchanger and an increase in the pressure drop through the exchanger.

SUMMARY OF THE INVENTION

In accordance with this invention, hot fluids that may contain salts and other dissolved minerals are passed in heat exchange relationship by direct contact with a working fluid circulating in a closed loop system. The working fluid advantageously has a specific gravity below that of the hot fluid so that the working fluid will rise in a chamber in which the hot fluid is passing from the top to the bottom at the operating pressures of the system. Additionally, the working fluid has a boiling point below the input temperature of the hot fluid. The pressure within the direct contact heat exchanger is controlled to permit a selected amount of the hot fluid to mix with the vaporized working fluid.

One particularly useful hot fluid is the water from a geothermal well which acts as a carrier for the heat that exists in the interior of the earth. When water from a geothermal well is the hot fluid, the fluid may first be passed through a flash chamber to separate any steam out, with the steam being applied directly to a heat exchanger for heating the working fluid. The non-condensible gases will be carried over by the steam. The hot liquid is applied to the direct contact heat exchanger. The condensate at the output of the heat exchanger to which the steam is applied may be combined with the hot liquid at the input to the direct contact heat exchanger. Alternatively, the steam may be passed through successive heat exchangers and condensed with the condensate being substantially pure distilled water which may be recovered and used. The working fluid is advantageously superheated in the direct contact heat exchanger and is thereafter expanded in a power extracting gas expansion device where it is reduced in pressure and temperature. Any steam mixed with the working fluid may also be superheated if desired. After passing through the power extracting device the working fluid is separated from any steam or water, condensed and returned to the direct contact heat exchanger as a liquid.

Advantageously, the condensing of the working fluid at the output of the power extracting gas expansion device may be accomplished in either a direct contact heat exchanger or an exchanger having a solid interfaced surface by passing the cooled hot fluid and/or water from a cooling tower therethrough.

BRIEF DESCRIPTION OF THE DRAWINGS

The above and other features and advantages of this invention may be understood more fully and clearly upon consideration of the following specification and drawings, in which.

DESCRIPTION OF THE PREFERRED EMBODIMENTS

There are many areas where hot fluid can be recovered from a geothermal well at a temperature up to approximately 450° F. or higher. In some areas, the hot fluid or brine will flow naturally to the surface while in others, pumping must be resorted to. In any event, the heat in the hot fluid can be recovered for the production of power. Additionally, there is considerable waste heat from oil refineries, atomic energy plants, etc. in the same temperature range as the fluid from a geothermal well that can be converted to useful power in accordance with this invention. By transferring heat from hot fluids, brines, and/or steam such as may be recovered from a geothermal well, working fluid which has a low boiling point, such as isobutane, and expanding the vapors so produced through a prime mover, a large amount of the heat may be converted to useful power. The working fluid exhausting from the prime mover can be condensed and passed in heat exchange relationship with the fluid at the output of the prime mover to recover some of the heat remaining in the working fluid after expansion. The working fluid may be recycled in the system.

The hot fluid or brine, at a temperature from approximately 130° F. to 200° F., after passing in heat exchange relationship with the working fluid can be passed back into the earth or, alternatively, treated to recover valuable dissolved minerals. Where the hot fluid has salts and other dissolved minerals therein, such as exists with the fluid from geothermal wells in the Imperial Valley of California, scaling may occur by the adherence of the salts or other minerals to the surfaces of the heat exchangers having a solid interface surface. This can greatly increase the pressure drop in the system and reduce the heat exchange transfer rate and substantially reduce the overall efficiency of the system.

Figure 1:
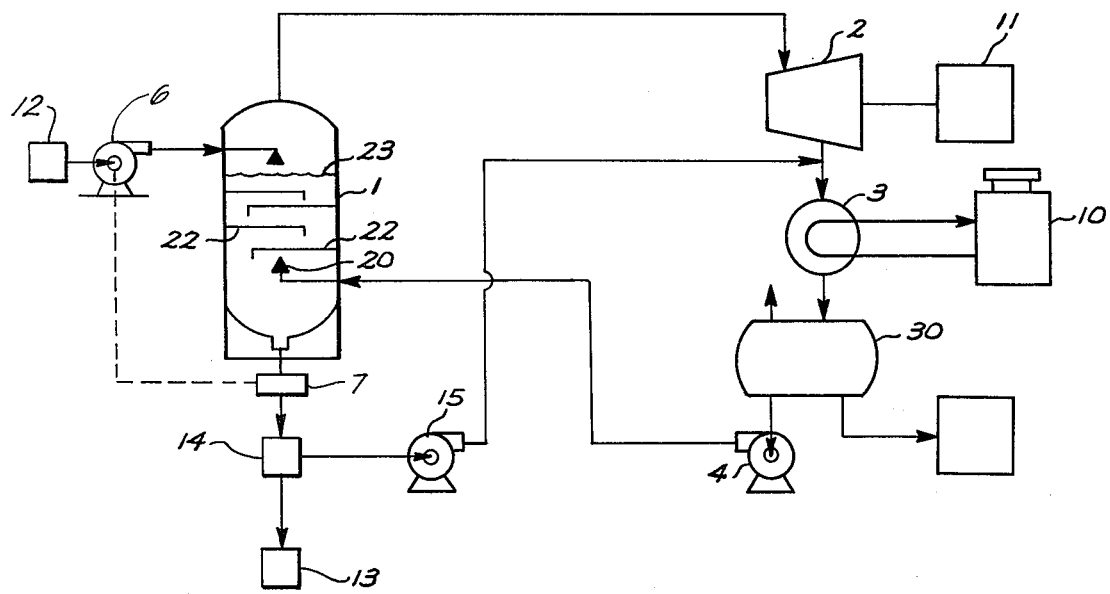
FIG. 1 is a process flow diagram for the efficient extraction of useful energy from hot fluids which may contain salts and other dissolved minerals in accordance with the present invention.

In order to overcome these difficulties the hot fluid which acts as a carrier from the primary source of energy is, in accordance with this invention, passed in heat exchange relationship by direct contact with the working fluid. A process flow diagram for the efficient recovery of energy from fluid which may contain salts and/or other dissolved minerals is shown in FIG. 1. For purposes of illustration, it is assumed that the hot fluid is a hot fluid from a geothermal well represented by block 12, which fluid may contain a large amount of salts and dissolved minerals. An operating or working fluid is converted to a vapor in a direct contact heat exchanger 1. The direct contact heat exchanger 1 is pressurized at a pressure related to the input temperature of the hot fluid and to the amount of hot fluid that may appear in the power extracting device with the working fluid. The working fluid is advantageously superheated in the exchanger 1. The vaporized working fluid is expanded in a prime mover or power extracting gas expansion device, such as a turbine 2, which is coupled to the output of the heat exchanger 1. The working fluid exhausts from the turbine 2 at a lower pressure and a lower temperature than the input pressure and temperature and is passed through a condenser 3 for de-superheating and condensing thereof. A pump 4 is connected between the condenser 3 and heat exchanger 1 for circulating the working fluid in the system. The working fluid is cooled in the condenser 3 by the passage of water from a cooling tower 10 through the condenser 3. The turbine 2 drives a utilization means such as a generator 11 for converting the extracted heat to useful power. There may be a plurality of condensers as well as heat exchangers. In any event, the hot fluid extracted from a geothermal source 12 is passed through the heat exchanger 1 in heat exchange relationship with the working fluid to transfer heat from the hot fluid to the working fluid. Thereafter, the hot fluid may be returned to the earth, as representatively shown by the block 13 in FIG. 1, or may be further processed for the extraction of minerals in the hot fluid. Prior to expulsion of the hot fluid from the system, it may be passed through a separator 14 to recover any working fluid that may be carried out of the heat exchanger with the cooled hot fluid. The recovered working fluid may then be reinjected into the system through a vacuum pump or a compressor 15.

The hot fluid from the well 12 or other source is admitted at the top of direct contact heat exchanger 1 where it comes in heat exchange relationship by direct contact with a working fluid that is admitted at the bottom of the heat exchanger 1 through a flow means 20.

The working fluid which has a low specific gravity relative to the hot fluid admitted at the top of the heat exchanger 1 passes upwardly through the chamber in direct contact with the hot fluid that flows from the top to the bottom of the heat exchanger 1. The hot fluid after giving up its heat is removed from the bottom of the exchanger through an opening 21 and may be returned to the earth through a well, represented by block 13, or further processed to remove the salts and other minerals that are carried out of the heat exchanger 1 by the fluid.

Heat exchanger 1 is maintained at the selected pressure by a pump 6 in the path of the hot fluid at the input to the exchanger 1. As a typical example, the hot fluid from a geothermal well may be increased in pressure from 135 psia to 700 psia by pump 6. The power in this fluid, due to the increased pressure, may be recovered by a power recovery device 7 in the path of the hot fluid at the output of the exchanger 1. Power recovery device 7 may advantageously be mechanically coupled, as representatively shown by the dotted line, to the pump 6 to drive the pump.

The direct contact heat exchanger 1 may have a conventional design with alternating trays 22 protruding from opposite sides to break up the flow of the fluid and to increase the surface contact between the working fluid and the hot fluid. The hot fluid may be at any selected level within the exchanger 1 such as is represented by line 23 in the exchanger 1.

The working fluid advantageously has a boiling point at the operating pressures of the system below that of the input temperature of the hot fluid. Also, the working fluid is substantially insoluble in the hot fluid under the operating pressures and temperatures of the system at the colder end of the direct contact heat exchanger 1.

One particularly good working fluid, when geothermal well water is the hot fluid, is isobutane. Isobutane has a boiling point of about 11° F. which is below the lowest temperature generally experienced with water from a geothermal well. Additionally, the isobutane has the desired specific gravity.

With fluid from a geothermal well as the hot fluid applied to the direct contact heat exchanger 1, and isobutane as the working fluid, the following temperatures and pressures may be advantageously employed in the system. A typical temperature for fluid from a geothermal well at the input of the direct contact heat exchanger 1 is 350° F. To control the vaporization of this hot fluid in the heat exchanger 1, the heat exchanger is maintained at a pressure of about 700 psia. The isobutane may also be maintained above its critical pressure while it is above its critical temperature in exchanger 1 and is given sufficient superheat in passing through the direct contact heat exchanger 1 to avoid condensation in a prime mover having 75% conversion efficiency. The amount of vaporized hot fluid entering the prime mover with the working fluid is dependent upon the operating pressure and is controlled to prevent condensation in the prime mover. The operating pressure at the input to the prime mover 2 may advantageously be above the critical pressure of the working fluid, such as 600 psia for isobutane, or it may be below the critical pressure. Additionally, the temperature of the working fluid does not have to be raised above its critical temperature. However, operation above the critical temperature generally results in higher efficiencies.

Additionally, the working fluid may be heated to a temperature below its critical temperature in the direct contact heat exchanger 1. The temperature and pressure of the working fluid at the output of the power extracting gas expansion device 2 will in any case be below the input temperature and pressure of the working fluid to the device.

The working fluid is expanded in the power extracting gas expansion device 2 which is representatively shown as a turbine and is then passed through a condenser 3 for condensation therein. The turbine 2 is coupled to a utilization means 11 which may advantageously be a generator for generating electricity.

The working fluid as a liquid at the output of the condenser 3 may contain some hot fluid carried over by the working fluid at the output of the direct contact heat exchanger 1. In this case, a separation chamber 30 may be positioned in the path of the working fluid at the output of the condenser 3 to separate the entrained hot fluid from the working fluid before recirculating the working fluid in the system. The working fluid is circulated by the action of the pump 4 at the output of the separation chamber 30. The working fluid is cooled down and condensed in the condenser 3 by a cooling fluid that carries away the absorbed heat to a cooling tower 10 which may advantageously operate at atmospheric conditions.

In many cases, fluid from a geothermal well may contain a mixture of steam and water at the surface and typically be at a temperature of 350° F. In this case, the fluid is advantageously passed through a flash chamber 32, shown in the process flow diagram of FIG. 2. The process flow diagram of FIG. 2 encompasses the process of FIG. 1 and the system components that are identical to those of the process flow diagram of FIG. 1 carry the same reference numbers as the elements in FIG. 1 and perform the same function in the process of FIG. 2.

Figure 2:
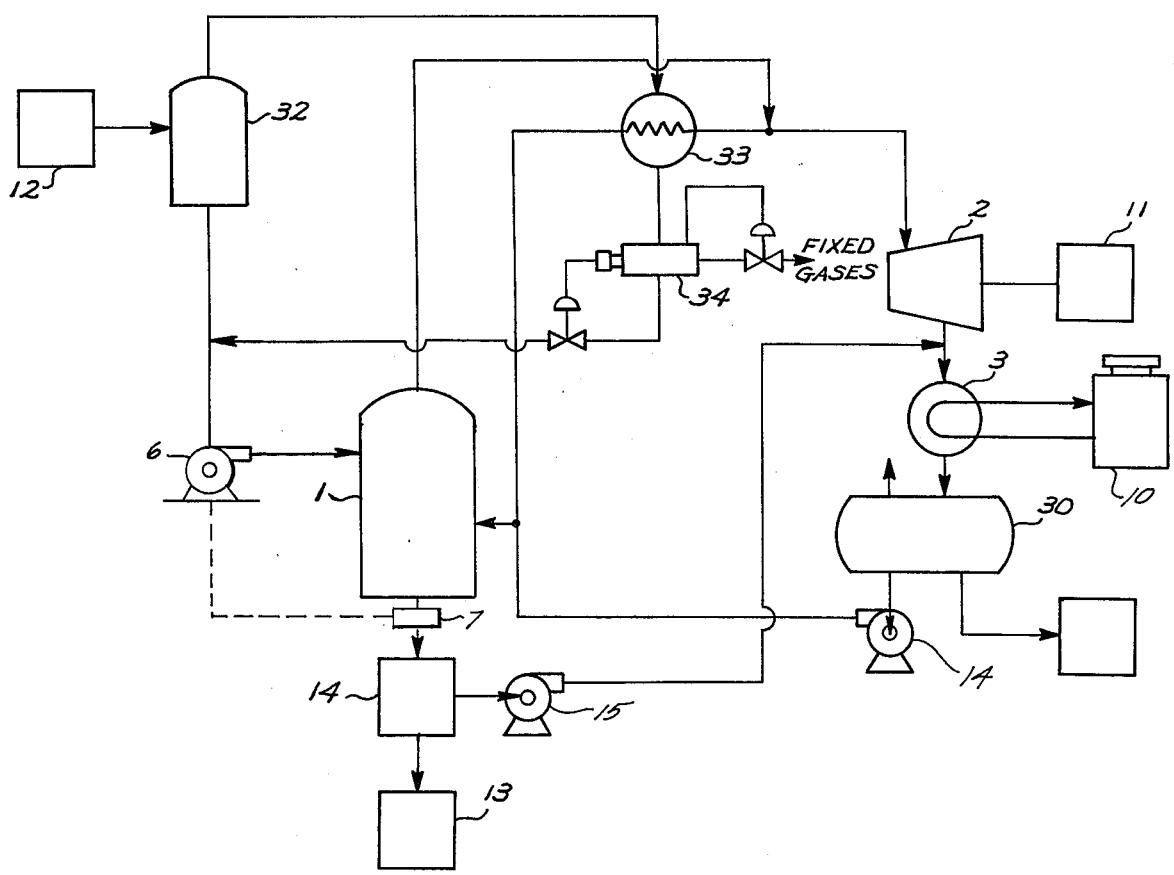
FIG. 2 is a process flow diagram that includes flashing a portion of the hot fluid and using the resultant steam in addition to the process of the process flow diagram of FIG. 1.

In the flash chamber 32, shown in FIG. 2, the steam will be separated from the water and the steam, which has relatively few impurities therein, may be passed through a surface contact heat exchanger 33 for transferring the heat from the steam to the working fluid. The working fluid may be split at the input to the direct contact heat exchanger 1 with a portion of it flowing through the heat exchanger 33 for vaporization by the heat from the steam passing through heat exchanger 33. Any fixed gases that may be present in the steam may be removed at the output of the heat exchanger 33 by passing the condensate at the output of heat exchanger 33 through a separator 34. The liquid at the output of the separator 34 may be combined with the liquid at the output of the flash chamber 32 for the recovery of the heat remaining in the condensate in the direct contact heat exchanger 1.

In addition to adjusting the pressure of the direct contact heat exchanger to control the amount of moisture in the working fluid, the relative proportion of steam can be controlled to prevent water condensation in the prime mover by varying the temperature of the working fluid or the degree of superheat in the working fluid at the output of exchanger 33. The total amount of steam that can be tolerated in the working fluid is determined by the prime movers outlet pressure and temperature.

Not only may the brine or fluid having salts and/or other minerals dissolved therein be advantageously employed to heat the working fluid in a direct contact heat exchanger but the brine and/or fluid may be employed in another direct contact heat exchanger to condense the working fluid so that it may be recycled in a closed system.

Figure 3:
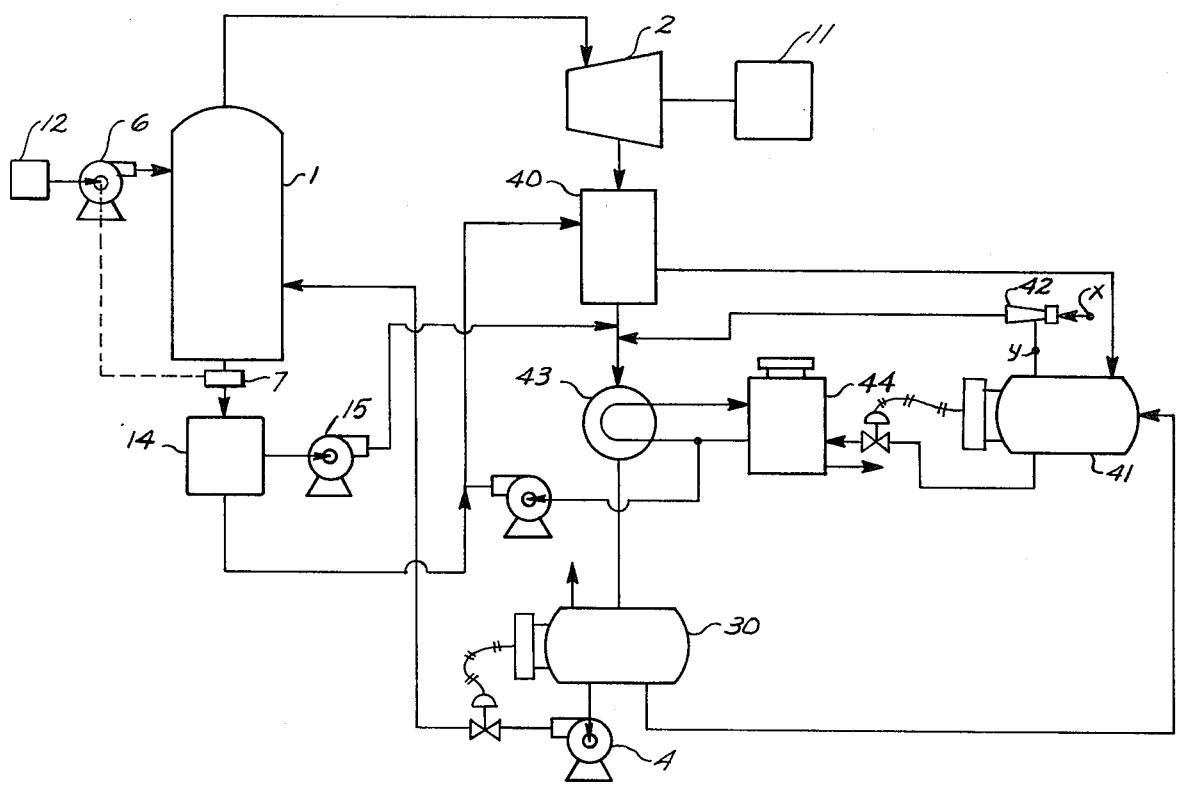
FIGS. 3 and 4 are process flow diagrams that include in addition to the process of the process flow diagram of FIG. 1, the use of the cooled hot fluid to condense the working fluid.
Figure 4:
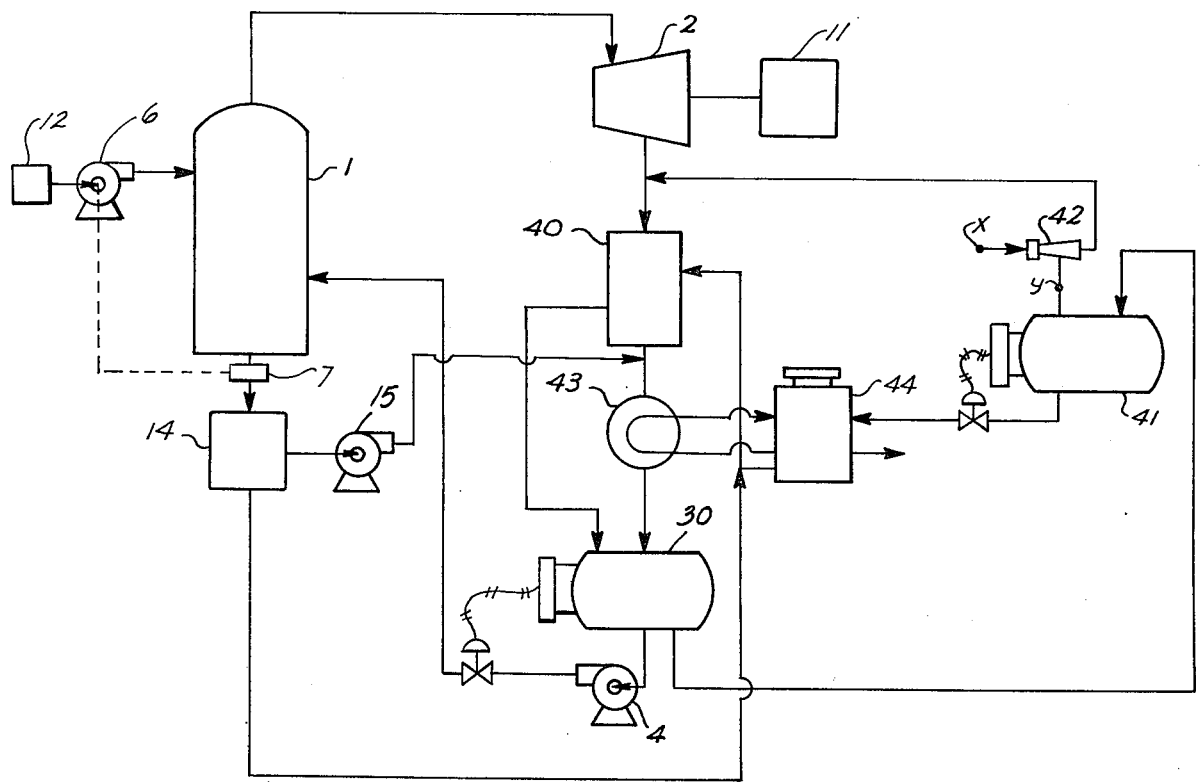

Alternative processes for condensing the working fluid with the brine and/or fluid having salts and/or other minerals contained therein are shown in the process flow diagrams of FIGS. 3 and 4. In the process of FIG. 3, a working fluid is vaporized in a direct contact heat exchanger 1 by the heat carried by a fluid from a source such as a geothermal well 12. The hot fluid passes from the top to the bottom of the direct contact heat exchanger 1 in vaporizing the working fluid and is passed through a separator 14 for removing any working fluid carried out by the hot fluid from the direct contact heat exchanger 1. The vaporized working fluid is passed through a power extracting gas expansion device 2 and then into a direct contact heat exchanger 40 for condensing or at least removing a large portion of the heat remaining in the working fluid at the output of the gas expansion device 2.

The brine at the output of heat exchanger 40 is applied to a flash chamber 41 for the separation of any working fluid that is carried over by the brine. In the flash chamber 41 the working fluid is taken out through output Y by the operation of a venturi tube 42 which has steam applied thereto through input X by a vacuum pump. The working fluid is combined with the working fluid at the output of the heat exchanger 40 and is further cooled, if necessary, in a condenser 43, which has a cooling fluid from a cooling tower 44 circulating therethrough. The working fluid thereafter passes through a separation chamber 30 to separate the working fluid from any of the brine that may be carried over by the working fluid. The working fluid is removed from the separator 30 and circulated by a pump 4 in the system.

In the alternative process of FIG. 4, the working fluid that is removed from the flash chamber 41 is applied to the input of the direct contact heat exchanger 40 for assisting in the cooling of the working fluid at the output of the power extracting gas expansion device 2. The working fluid at the output of the heat exchanger 40 is passed through a condenser 43 having a cooling fluid circulating therein to further cool the working fluid. The condensed working fluid and the fluid employed in the direct contact heat exchanger 40 to cool the working fluid are applied separately to a separation chamber 30 for separating the working fluid from the other fluids.

Figure 5:
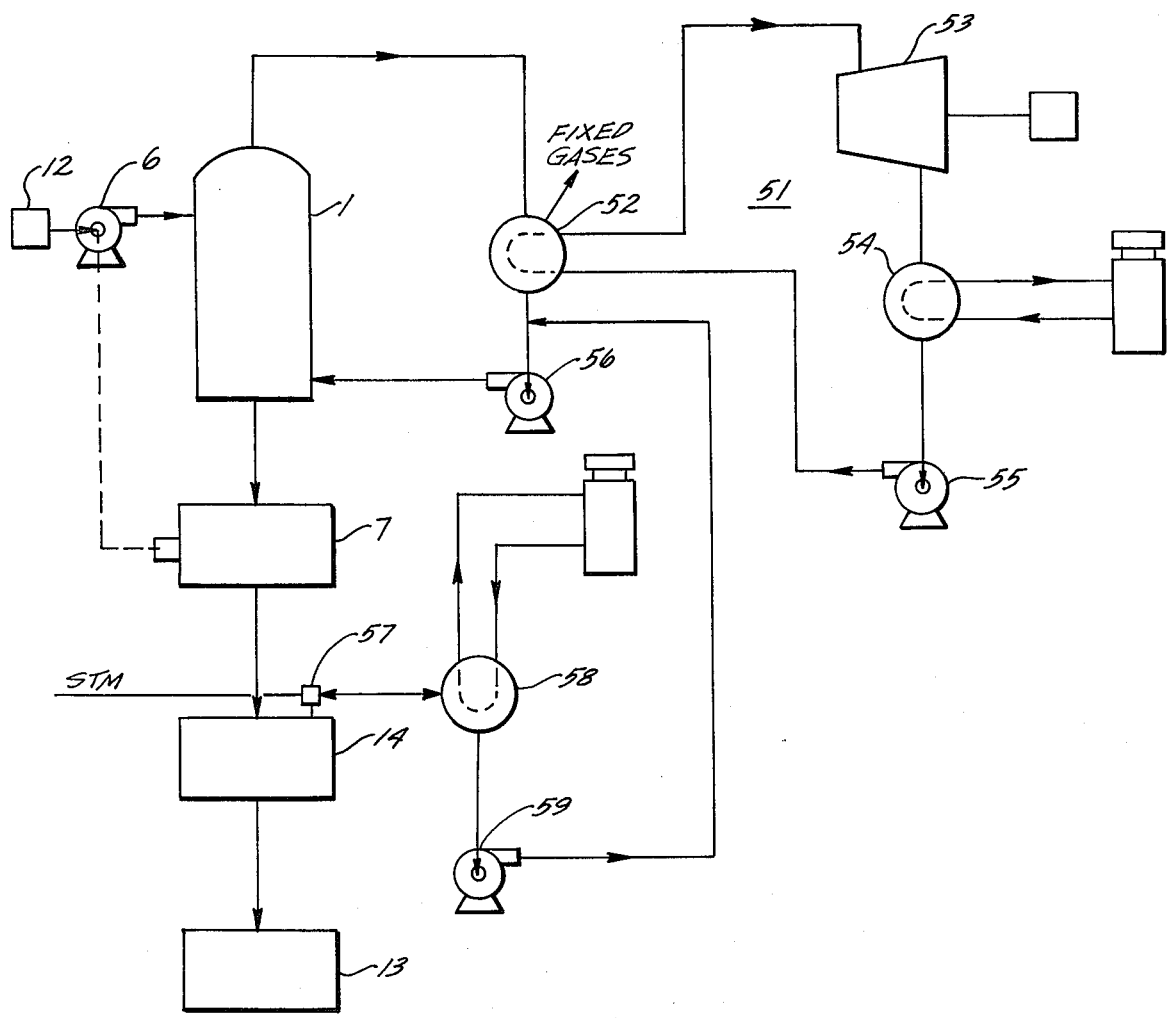
FIG. 5 is a process flow diagram for a process employing a volatile heat transfer fluid at the operating temperature and pressure of the direct contact heat exchanger in accordance with this invention.

The contamination of the working fluid by the brine that may occur in the processes of FIGS. 1 through 4 may be avoided by the process depicted in the process flow diagram of FIG. 5. The working fluid is circulated in a first closed loop 51 wherein it passes through a heat exchanger 52, a power extracting gas expansion device 53, a condenser 54 and a pump 55 in series. Again, for illustrative purposes, it is assumed that the heat is derived from a geothermal well and is carried by a hot fluid from the geothermal well 12. The hot fluid is pumped into a direct contact heat exchanger 1 where it comes in contact with a heat transfer fluid which has a boiling point below the input temperature of the hot fluid. The heat transfer fluid is vaporized in the direct contact heat exchanger 1 and passes through the surface contact heat exchanger 52 to superheat the working fluid that passes through the closed loop 51. The heat transfer fluid in passing through the heat exchanger 52 condenses and is pumped as a liquid into the bottom of the direct contact heat exchanger 1 by a pump 56. The heat transfer fluid may be the same substance as the working fluid and in any event is vaporized in the direct contact heat exchanger 1. Any heat transfer fluid that is carried out of the direct contact heat exchanger by the hot fluid is recovered in the separator 14 in the same manner that the working fluid is recovered in the process flow diagrams of FIGS. 1 and 2. The heat transfer fluid is expanded in the power recovery device 7 and appears as a liquid in the separator 14. In the separator 14 the heat transfer fluid is boiled off and passes through the venturi tube 57 to a condenser 58. The heat transfer fluid is condensed in the condenser 58 and is pumped by pump 59 back to the outlet of the heat exchanger 52 where it joins the condensate at the outlet of the heat exchanger 52.

Various changes may be made in the details of construction without departing from the spirit and scope of this invention as defined by the appended claims.

What is claimed is:

1. A method of producing power from geothermal heat with fluid as the carrier thereof by recovering the heat from the liquid portion of a geothermal fluid which may contain salts and other dissolved minerals comprising the steps of:
    passing the geothermal liquid in heat exchange relationship above the ground by direct contact with a working fluid to vaporize the working fluid, the working fluid having a boiling point below the input temperature of the geothermal fluid; and
    expanding resulting vaporized fluid in a power extracting gas expansion device.

2. The method in accordance with claim 1 comprising the further step of passing the expander exhaust fluid as a liquid at the output of the condenser through a separator to separate the working fluid and any geothermal liquid carried over by the working fluid.

3. The method in accordance with claim 1 wherein the pressure in the direct contact heat exchanger is selected with respect to the entering temperature of the geothermal fluid to control the amount of geothermal fluid carried out of the exchanger by the working fluid.

4. The method in accordance with claim 1 wherein the working fluid has a specific gravity below that of the geothermal fluid and is substantially insoluble in the geothermal fluid under the operating temperatures and pressures of the system at the colder end of the direct contact heat exchanger.

5. The method in accordance with claim 1 comprising the further step of passing the geothermal liquid at the output of the direct contact heat exchanger in heat exchange relationship with the working fluid after expansion of the working fluid to condense the working fluid.

6. The method in accordance with claim 5 comprising the further step of passing the condensed working fluid and the geothermal fluid used to condense the working fluid through a separator to separate the working fluid and the geothermal fluid.

7. The method in accordance with claim 5 comprising the additional step of combining fluid from a cooling tower operating at atmospheric conditions with the geothermal fluid to condense the working fluid.

8. The method in accordance with claim 1 comprising the further step of passing the geothermal fluid at the output of the direct contact heat exchanger through a separator to remove any working fluid carried over by the geothermal fluid.

9. The method in accordance with claim 1 comprising the further steps of passing the geothermal fluid through a flash chamber to separate the gaseous fluid from the liquid and passing the gaseous fluid in heat exchange relationship with the working fluid.

10. The method of claim 1 including the further steps of:
    condensing the expander exhaust fluid; and
    recirculating the working fluid to the direct contact heat exchanger.

11. A method of producing power from geothermal heat by recovering the heat from an aqueous liquid which may contain salts and other dissolved minerals comprising the steps of:
    passing the geothermal aqueous liquid in heat exchange relationship above the ground by direct contact with a working fluid to vaporize the working fluid; and
    expanding the resulting vaporized mixture of working fluid and geothermal vapors in a power extracting gas expansion device;
    condensing the exhaust gases from the expansion device; and
    recirculating the working fluid in a closed loop.

* * * * *